US012069009B2

(12) United States Patent
Laurent et al.

(10) Patent No.: US 12,069,009 B2
(45) Date of Patent: Aug. 20, 2024

(54) DIGITAL MESSAGING WITH RULE-DRIVEN ATTACHMENTS

(71) Applicant: Oracle International Corporation, Redwood Shores, CA (US)

(72) Inventors: Nicole Jodie Laurent, Lakewood, CO (US); Haiyan Wang, Parker, CO (US); Brett Weston McGarity, Aurora, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/725,912

(22) Filed: Apr. 21, 2022

(65) Prior Publication Data
US 2023/0344784 A1 Oct. 26, 2023

(51) Int. Cl.
*H04L 51/02* (2022.01)
*H04L 51/08* (2022.01)

(52) U.S. Cl.
CPC .............. *H04L 51/02* (2013.01); *H04L 51/08* (2013.01)

(58) Field of Classification Search
CPC ................................ H04L 51/02; H04L 51/08
See application file for complete search history.

(56) References Cited

U.S. PATENT DOCUMENTS

| | | | | |
|---|---|---|---|---|
| 2004/0122900 A1* | 6/2004 | Pous | .................... | G06Q 10/107 709/206 |
| 2004/0136513 A1* | 7/2004 | Chiu | .................... | H04L 51/066 379/100.08 |
| 2005/0027695 A1* | 2/2005 | John | .................... | G06Q 10/107 |
| 2008/0026845 A1* | 1/2008 | Aguilar | .................. | A63F 13/77 463/42 |
| 2009/0177484 A1* | 7/2009 | Davis | .................... | G06Q 30/02 706/11 |
| 2011/0119102 A1 | 5/2011 | Horn et al. | | |

OTHER PUBLICATIONS

Zhang (How to Auto Attach Specific Files When Sending Specific Emails in Outlook), Outlook Data Recovery, Outlook Solutions. (Year: 2017).*
"Attach Pdf's to Order Emails", Retrieved at https://magento2-support.fooman.co.nz/article/1235-7-attach-pdfs-to-order-emails, Oct. 14, 2021, 2 Pages.
"Auto attachment file for email service c# asp.net", Retrieved at https://stackoverflow.com/questions/44381633/auto-attachment-file-for-email-service-c-sharp-asp-net, Oct. 13, 2021, 3 Pages.
(Continued)

*Primary Examiner* — Soe Hlaing
(74) *Attorney, Agent, or Firm* — Invoke

(57) ABSTRACT

Techniques for digital messaging with rule-driven attachments are disclosed, including: obtaining a message assembly rule including a set of one or more message attachment criteria; encountering an instance of a set of one or more message transmission triggers being satisfied; responsive to encountering the instance of the set of one or more message transmission triggers being satisfied: querying a data repository to identify multiple attachable data items that satisfy the set of one or more message attachment criteria; generating a message including the attachable data items; transmitting the message to a recipient.

14 Claims, 13 Drawing Sheets

(56) References Cited

OTHER PUBLICATIONS

"Automatically adding attachments to all outgoing mail messages", Retrieved at https://stackoverflow.com/questions/4765698/automatically-adding-attachments-to-all-outgoing-mail-messages, Oct. 13, 2021, 2 Pages.

"Configure file attachment capability", Retrieved at https://docs.microsoft.com/en-us/dynamics365/customer-service/configure-file-attachment, Jul. 8, 2021, 7 Pages.

"File Attachments on Tickets", Retrieved at https://www.teamsupport.com/1/en/topic/adding-file-attachments, Oct. 14, 2021, 1 Page.

"Fooman Email Attachments (Magento 1)", Retrieved at https://fooman.com/magento-extension-email-attachments.html, Retrieved on Jun. 2022, 5 Pages.

"How to add email attachments to Orchestrator Queues", Retrieved at https://forum.uipath.com/t/how-to-add-email-attachments-to-orchestrator-queues/239486, Oct. 14, 2021, 2 Pages.

"How to Auto Attach Specific Files When Sending Specific Emails in Outlook", Retrieved from https://www.datanumen.com/blogs/auto-attach-specific-files-sending-specific-emails-outlook/, Jan. 22, 2017, 5 Pages.

"How to automatically attach a file to all outgoing email?", Retrieved at https://www.odoo.com/forum/help-1/how-to-automatically-attach-a-file-to-all-outgoing-email-21712, Jun. 19, 2013, 3 Pages.

"How to send multiple emails with different attachments in Gmail", Retrieved at https://www.gmass.co/blog/mass-email-with-personalized-attachments/, Mar. 19, 2021, 16 Pages.

"How to Send Personal Attachments to Your Subscribers", Retrieved from http://easymail7.com/tutorials/send-personal-attachments/, Retrieved on Jun. 2022, 7 Pages.

"JD Edwards EnterpriseOne Tools Internet of Things Orchestrator Guide," Release 9.1.5.5, May 2015, pp. 30.

"Learn how to attach a file to an email template", Retrieved at https://help.salesforce.com/s/articleView?id=000325759&type=1, Mar. 3, 2021, 2 Pages.

"Outlook: Automatically Attach Files in New Message", Retrieved at https://www.extendoffice.com/documents/outlook/1612-outlook-auto-attach-file.html, Retrieved on Jun. 2022, 6 Pages.

"Send E-Mails with attachments weekly with power automate", Retrieved at https://peakup.org/blog/send-e-mails-with-attachments-weekly-with-power-automate/, Retrieved on Jun. 2022, 2 Pages.

\* cited by examiner

FIG. 3B

| | | |
|---|---|---|
| Name | CaseNotification | Product Code 55 - Reserved for Clients |
| Description | CaseNotification | Category |

316 {
- To [Address Book ▾] Address Book [${assignee}]
- Cc [Select Type ▾]
- Bcc [Select Type ▾]

✎ Preview

Subject [Case Attachments for ${caseNo} - ${description}]

See attachments for:

Case: ${caseNo} - ${description}
Customer: ${customer}
Assigned: ${assignee} ${name}

318 {
- ▷ Data Dictionary
- ▷ Application Links - 0    ⊕ Add
- ▷ Other Links - 0          ⊕ Add
- ◁ Attachments - 1
  - ▷ Report Attachments     ⊕ Add
  - ◁ File Attachments       ⊕ Add

| Structure Name | Key | Which Attachments | Attachment Type | Sequence | File Extension |
|---|---|---|---|---|---|
| ✎ GT1755 | ${mnCallNumber}|${szCallDocumentType}| | First | Text | | |

Raiche, Bessie
[JDV920]

△ Configuration

Notification Name: CaseAttachments
Notification Description: CaseAttachments
Subscription Name:

CaseAttachments

326

Walters, Annette
[JDV920]

△ Configuration

Notification Name: CaseAttachments
Notification Description: CaseAttachments
Subscription Name:

CaseAttachments

| | |
|---|---|
| Name | CaseAttachments |
| Description | CaseAttachments |

Type [ Orchestration ▾ ]   Run as Subscriber ◯  Allow Subscriber Overrides ◯   ✕ Test ▷ Notification Inputs ▽ Orchestration 🔍 Select Orchestration   CasesByAssigneeNotify CasesByAssigneeNotify

| Orchestration Input | | Value Type |
|---|---|---|
| No data to display. | | |

▷ Rule
▷ Message
▽ Schedule

🔍 Select Schedule   OnceADay

OnceADay ✎ ✕

Work With Case Management

✓ 🔍 + ☐ ✕ 🗑 ≡ Row ⊞ Form ⚙ Tools ⏱ One View

| Provider Group | ☐ * | | ☐ By Time Zone |
|---|---|---|---|
| Assignee | ☐ * | | ☐ Display Customer Time |
| Customer Number | ☐ * | | |
| Equipment Number | | | |
| Inventory Item Number | ☐ | | |
| Date Entered From/Thru | * | 100 | Doc Type * |
| Status From/Thru | 100 | | Parent Case Number * |
| Case Reason | * | | |
| Resp Business Unit | | | |

Find

Records 1 - 4

| | | Case Number | Description | Doc Type |
|---|---|---|---|---|
| ☐ | ☑ | 9 | ADDING NEW EXTENSIONS. WE ARE MOVING TO A NEW FLOOR OF OUR BUILDING AND WE NEED | CL |
| ☐ | 📎 | 16 | NON-STANDARD CHARACTERS: WE NEED TO PRINT SOME MATERIAL WITH NON ENGLISH CHARACT | CL |
| ☐ | 📎 | 18 | SOFTWARE HAS A BUG | CL |
| ☐ | 📎 | 30 | FORKLIFT ENGINE IS MIS-FIRING, CAUSING THE ENGINE TO PERIODICALLY STAHL. | CL |

| Personal Form: | (No Personalization) ∨ | Layout: | | | | |
|---|---|---|---|---|---|---|
| Assignee | Assignee Name | | Caller Address | Caller Name | | |
| 2006 | Walters, Annette | | 4242 | Capital System | J | |
| 2006 | Walters, Annette | | 4271 | Consolidation Fuel Brokers | V | |
| 7 | Raiche, Bessie | | 3004 | Pacific Company, The | K | |
| 7 | Raiche, Bessie | | 8447 | Brown, Harvey J. | H | |

FIG. 3G (Continued)

| nicole.laurent@oracle.com | Case Attachments for 30 - FORKLIFT ENGINE IS MIS-FIRING, CAUSING THE ENGINE TO PERIODICALLY STAHL. |
| nicole.laurent@oracle.com | Case Attachments for 18 - SOFTWARE HAS A BUG |

⌇336

Case Attachments for 30 - FORKLIFT ENGINE IS MIS-FIRING, CAUSING THE ENGINE TO PERIODICALLY STAHL.

⌇338

📎 Text.html
  2 KB

See attachments for:

Case: 30 - FORKLIFT ENGINE IS MIS-FIRING, CAUSING THE ENGINE TO PERIODICALLY STAHL.
Customer: Brown, Harvey J.
Assigned: 7 Raiche, Bessie

---

| nicole.laurent@oracle.com | Case Attachments for 9 - ADDING NEW EXTENSIONS. WE ARE MOVING TO A NEW FLOOR OF OUR BUILDING AN.. |
| nicole.laurent@oracle.com | Case Attachments for 16 - NON-STANDARD CHARACTERS: WE NEED TO PRINT SOME MATERIAL WITH NON EN.. |

⌇340                                                      ⌇342

← Back to message
Last changed: Tuesday, July 20, 2021

📎 Text.html
  2 KB

| 07/20/2021 | 15:00:00 | NICOLE  | 42 Mountain Time (US & Canada) |
|---|---|---|---|
| TEST Update | | | |
| 06-07-21 | 14:56:00 | MICHAEL | 42 Mountain Time (US & Canada) |
| 06-07-21 | 14:55:00 | MICHAEL | 42 Mountain Time (US & Canada) |

FIG. 3H

DIGITAL MESSAGING WITH RULE-DRIVEN ATTACHMENTS

TECHNICAL FIELD

The present disclosure relates to digital messaging. In particular, the present disclosure relates to attaching data to digital messages.

BACKGROUND

An email system typically allows users to manually attach files—for example, text documents, spreadsheets, portable document format (PDF) files, multimedia files, etc.—to outgoing emails. Some other kinds of messaging systems also support user-selected attachments. For example, some webmail systems support manual attachments, using the web browser's built-in file navigation interface. In such systems, the user must manually navigate to a specific file location and select the file(s) to attach. If the user wishes to attach multiple files from different storage locations, the user must navigate to each of those storage locations independently and select the file(s) to attach.

Some software systems are configured to generate reports. To generate a report, the system queries a database for raw data (e.g., sales data), computes one or more values based on the raw data (e.g., aggregate sales), and generates a report that includes the computed value(s) (e.g., as a PDF file). Reports typically are generated upon request; they do not exist before the request and are not stored after the request is fulfilled. Because the raw data changes over time, the same report may be different from one request to the next.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and mean at least one. In the drawings:

FIGS. 3A-3I illustrate examples of graphical user interfaces (GUIs) in accordance with one or more embodiments.

DETAILED DESCRIPTION

In the following description, for the purposes of explanation and to provide a thorough understanding, numerous specific details are set forth. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

The following table of contents is provided for reference purposes only and should not be construed as limiting the scope of one or more embodiments.

1. GENERAL OVERVIEW
2. EXAMPLE SYSTEM
   2.1. MESSAGE ASSEMBLY SERVICE
   2.2. DATA ELEMENTS
   2.3. MESSENGER
   2.4. USER INTERFACE
   2.5. TENANTS
3. DIGITAL MESSAGING WITH RULE-DRIVEN ATTACHMENTS
4. EXAMPLE EMBODIMENT
5. COMPUTER NETWORKS AND CLOUD NETWORKS
6. MICROSERVICE APPLICATIONS
   6.1. TRIGGERS
   6.2. ACTIONS
7. HARDWARE OVERVIEW
8. MISCELLANEOUS; EXTENSIONS

1. GENERAL OVERVIEW

One or more embodiments assemble and transmit messages that include attachments, with minimal user intervention required, based on message assembly rules. Once a message assembly rule is configured and active, no user intervention at all may be required. A user may need only to subscribe to the message assembly rule, in order to receive the corresponding message(s) whenever one or more message transmission trigger(s) is/are satisfied. Before a file is attached to a message, a user subscribing to the message assembly rule does not even need to know that the file exists, how many files exist that satisfy the specified criteria, the name(s) of the file(s), or how the file(s) is/are stored.

Thus, the system is able to send messages faster and more reliably than if manual intervention were required for each message. In addition, fewer system resources (e.g., memory, compute cycles, network bandwidth, etc.) are generally needed when less user intervention is needed, because the system does not need to devote the resources to serving up a user interface, responding to user input, etc.

One or more embodiments described in this Specification and/or recited in the claims may not be included in this General Overview section.

2. EXAMPLE SYSTEM

Figure 1:
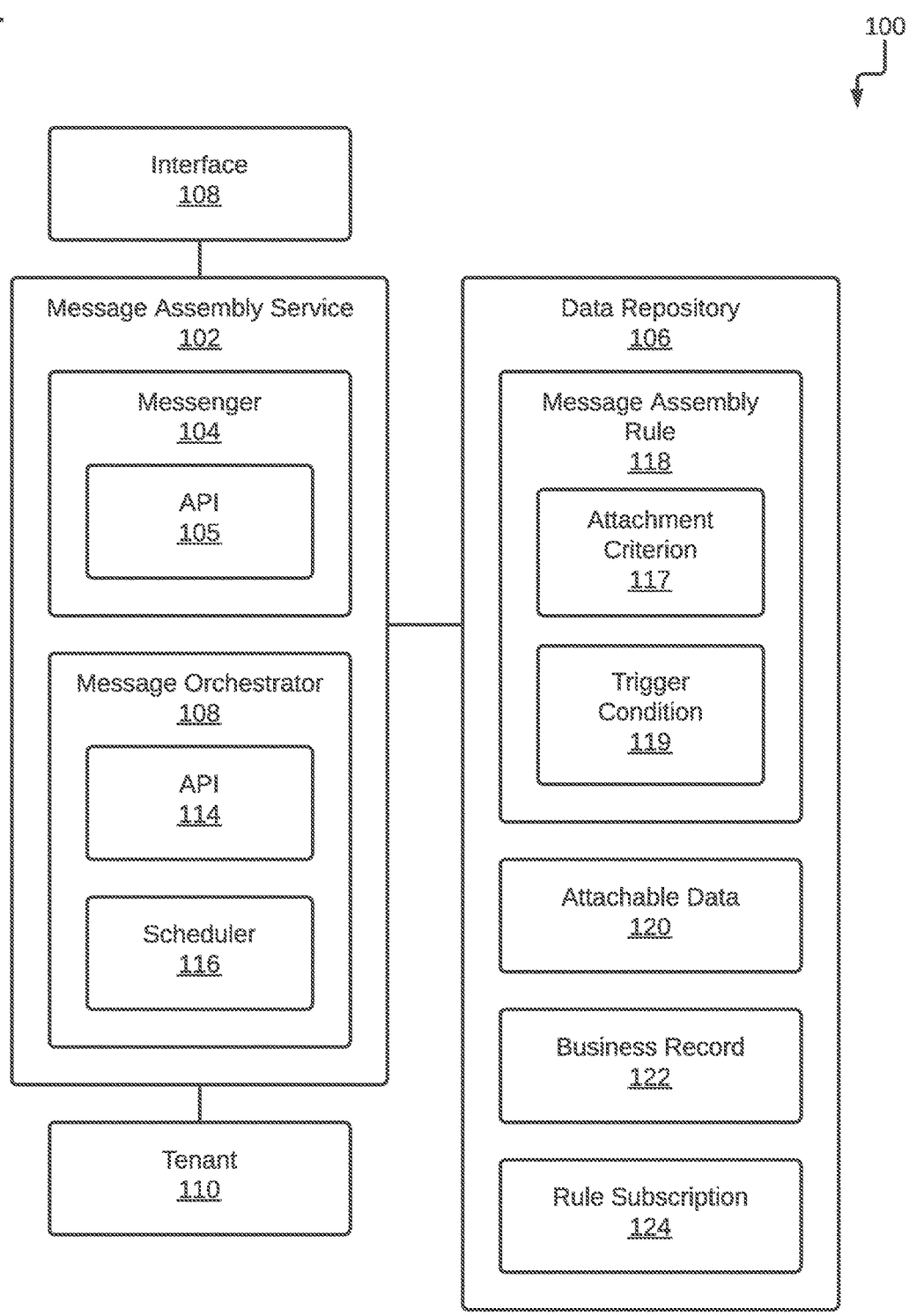
FIG. 1 shows a block diagram that illustrates an example of a system in accordance with one or more embodiments.

FIG. 1 illustrates an example of a system 100 in accordance with one or more embodiments. As illustrated in FIG. 1, the system 100 includes a message assembly service 102, a data repository 106, an interface 108, a tenant 110, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In one or more embodiments, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

2.1. Message Assembly Service

In one or more embodiments, a message assembly service 102 refers to hardware and/or software configured to perform operations for digital messaging with rule-driven attachments, examples of which are described below. The message assembly service 102 may be configured to operate as a multi-tenant software-as-a-service (SaaS) product. Alternatively, the message assembly service 102 may be configured for only a single organization. For example, the message assembly service 102 may be accessible only from within a business' private network, so that features described herein are available to authorized users within that network.

2.2. Data Elements

In one or more embodiments, a data repository 106 is configured to store data used for digital messaging with rule-driven attachments. The data may include one or more message assembly rules 118, attachable data 120, one or more business records 122, and/or one or more rule subscriptions 124. Each of these data elements is described in further detail below.

The data repository 106 may be any type of storage unit and/or device (e.g., a file system, database, collection of tables, and/or any other storage mechanism) for storing data. The data repository 106 may include multiple different storage units and/or devices. The multiple different storage units and/or devices may or may not be of the same type or located at the same physical site. The data repository 106 may be implemented or executed on the same computing system as the message assembly service 102, and/or on a computing system separate from the message assembly service 102. The data repository 106 may be communicatively coupled to the message assembly service 102 via a direct connection or via a network. Information describing message assembly rules 118, attachable data 120, and/or business records 122 may be implemented across any of the components of the system 100. However, this information is illustrated within the data repository 106 for purposes of clarity and explanation.

2.2.1. Attachable Data and Business Records

The data repository 106 may be configured to store attachable data 120. Attachable data 120 is data that can be attached to a message. For example, attachable data 120 may include one or more text documents, spreadsheets, PDFs, raw text, multimedia files, HTML files, and/or other kinds of data. Alternatively or additionally, the attachable data 120 may include data that can be combined into a single attachable file.

Attachable data 120 may be associated with one or more business records 122. Business records 122 are records associated with one or more business entities, functions, relationships, etc. As some non-limiting examples:

The business records 122 may include customer records. Attachable data 120 associated with respective customer records may include contact information, purchase histories, support tickets, and/or other kinds of customer-specific data.

The business records 122 may include employee records. Attachable data 120 associated with respective employee records may include performance data (e.g., hours logged, commissions earned, etc.), compensation data, benefits data, and/or other kinds of employee-specific data.

The business records 122 may include product records. Attachable data 120 associated with respective product records may include product specifications, support documentation, sales data, and/or other kinds of product-specific data.

2.2.1. Message Assembly Rules

The data repository 106 may be configured to store one or more message assembly rules 118. In general, a message assembly rule 118 may define (1) when a message should be sent, (2) one or more criteria for determining which attachment(s), if any, to include in the message, and (3) the contents of the message aside from the attachment(s), such as text and/or multimedia content, a message subject, the sender's address, etc.

A message assembly rule 118 may include one or more attachment criteria 117. For a given message that is assembled according to a message assembly rule 118, an attachment criterion 117 restricts which of the attachable data 120 is eligible to be attached to that message. As some non-limiting examples:

An attachment criterion 117 may identify a specific user, so that only data associated with that user is attached to the message.

An attachment criterion 117 may identify a specific file type, so that only data of that type is attached to the message.

An attachment criterion 117 may identify a specific relationship to a business record 122, such as the most- or least-recent data of a particular kind associated with that business record 122, so that only data bearing that relationship to the business record 122 is attached to the message.

An attachment criterion 117 may identify a specific date range (e.g., a specific day, week month, quarter, year, etc.), so that only data generated and/or stored within that date range is attached to the message.

An attachment criterion 117 may indicate one or more credentials needed to attach a file. In an embodiment, by default, the system 100 enforces a requirement that attachments can only be sent to users who would otherwise have access to those attachments. Thus, one or more embodiments do not allow users to circumvent file permissions to obtain unauthorized data by email notifications.

A message assembly rule 118 may include multiple attachment criteria 117 that combine to form a more complex set of restrictions on the attachable data 120.

An attachment criterion 117 may include one or more variables. A variable is a placeholder for a value used by the attachment criterion 117. A variable in an attachment criterion 117 allows for the same message assembly rule 118 to be used in different situations where the value of the variable differs, without requiring separate message assembly rules 118 for each such situation. For example, if an attachment criterion 117 is used to identify a specific employee, it may include a variable for an employee identifier. An attachment criterion 117 may include a default value of a variable (e.g., a default email address, such as an email address monitored by a system administrator), in the event that no value is provided at the time of message assembly. A message orchestrator 108 (described in further detail below) may be configured to supply the value(s) of one or more variables of an attachment criterion 117.

A message assembly rule 118 may include one or more trigger conditions 119. A trigger condition 119, also referred to herein as a message transmission trigger, includes one or more criteria that indicate if/when a message should be sent. As some non-limiting examples:

- A trigger condition 119 may indicate that a message should be sent according to a particular schedule. For example, a trigger condition 119 may indicate that a message should be sent once per day, week, month, quarter, year, on holidays, etc. A schedule may be predetermined or user-specified.
- A trigger condition 119 may indicate that a message should be sent when a particular data condition is satisfied, such as when a set of data (e.g., sales data, performance data, a number of errors logged, etc.) satisfies a threshold value. A threshold value may be predetermined or user-specified.
- A trigger condition 119 may indicate that a message should be sent on demand, such as when the message orchestrator API 114 is called.
- A message assembly rule 118 may include multiple trigger conditions 119 that combine to form a more complex set of criteria for when a message should be sent.

2.2.2. Rule Subscriptions

The data repository 106 may be configured to store one or more rule subscriptions 124. A rule subscription 124 associates a specific recipient (e.g., a particular user) with a message assembly rule 118. Messages generated according to a message assembly rule 118 are sent to any recipient(s) who has/have subscribed to that message assembly rule 118.

A rule subscription 124 may supply the value(s) of one or more variables used in an attachment criterion 117. As one example, if an attachment criterion 117 includes a "user identifier" variable, each subscriber's respective user identifier may be used to identify which attachment(s) to include for that subscriber. As another example, if an attachment criterion 117 includes a "data range" variable, each subscriber may be able to specify a particular date range (e.g., the past day, week, month, quarter, year, etc.).

2.3. Messenger

The message assembly service 102 may include a messenger 104. A messenger 104 includes hardware and/or software configured to transmit messages to one or more recipients. A message may be an email, text message, cloud-hosted message (e.g., a webmail message), or another kind of message. For example, the messenger 104 may be an email service configured to send emails to designated recipients, optionally including attachments to the emails.

The messenger 104 may include an application programming interface (API) 105 configured to receive message data such as text content, recipient and/or sender identifiers (e.g., email addresses, phone numbers, etc.), attachments, etc. The API 105 may include a representational state transfer (REST) API and/or other kind of interface. The messenger 104 may be configured to transmit a message to the designated recipient(s), using some or all of the message data supplied via the API 105, for example using Simple Mail Transfer Protocol (SMTP), Post Office Protocol (POP), Internet Message Access Protocol (IMAP), and/or another messaging protocol.

In FIG. 1, the messenger 104 is illustrated as a component of the message assembly service 102. Alternatively, the message service 104 may operate independent of the message assembly service 102. For example, the message service 104 may be a third-party messaging service. The message assembly service 102 may be configured to store credentials that permit it to use a third-party messenger 104 to assemble and transmit messages.

2.3.1. Message Orchestrator and Message Assembly Rules

The message assembly service 102 may include a message orchestrator 108. The message orchestrator 108 refers to hardware and/or software configured to perform operations for orchestrating (i.e., directing the flow of) message assembly and transmission. Specifically, the message orchestrator 108 is configured to orchestrate message assembly and transmission responsive to detecting that one or more message transmission trigger conditions 119 associated with a message assembly rule 118 is/are satisfied.

The message orchestrator 108 may include an API 114 configured to receive instructions from another component. The API 114 may include a REST API and/or other kind of interface. For example, the system 100 may include a scheduler that is not specific to the message assembly service 102 (e.g., a cron job or other scheduling service) that is configured to call the API 114 according to a predetermined or user-defined schedule (e.g., at one or more specific times per day, week, month, etc.). Alternatively or additionally, the message orchestrator 108 may include its own scheduler 116. The API 114 may be accessible to other components. For example, the system 100 may include a user-facing email client (not shown) including one or more controls to attach file(s) to an email according to a message assembly rule 118. When a user selects the control(s), the email client calls the API 114 to obtain any attachment(s) that satisfy the message assembly rule 118.

2.4. User Interface

In one or more embodiments, an interface 108 refers to hardware and/or software configured to facilitate communications between a user and the message assembly service 102. The interface 108 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. Different components of the interface 108 may be specified in different languages. For example, the behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively, the interface 108 may be specified in one or more other languages, such as Java, Python, C, or C++.

2.5. Tenants

In one or more embodiments, a tenant 110 is a corporation, organization, enterprise, or other entity that accesses a shared computing resource, such as the message assembly service 102. The system 100 may include multiple tenants 110 that are independent from each other, such that a business or operation of one tenant is separate from a business or operation of another tenant. Some examples of multi-tenant architectures in accordance with one or more embodiments are described in further detail below.

3. DIGITAL MESSAGING WITH RULE-DRIVEN ATTACHMENTS

Figure 2:
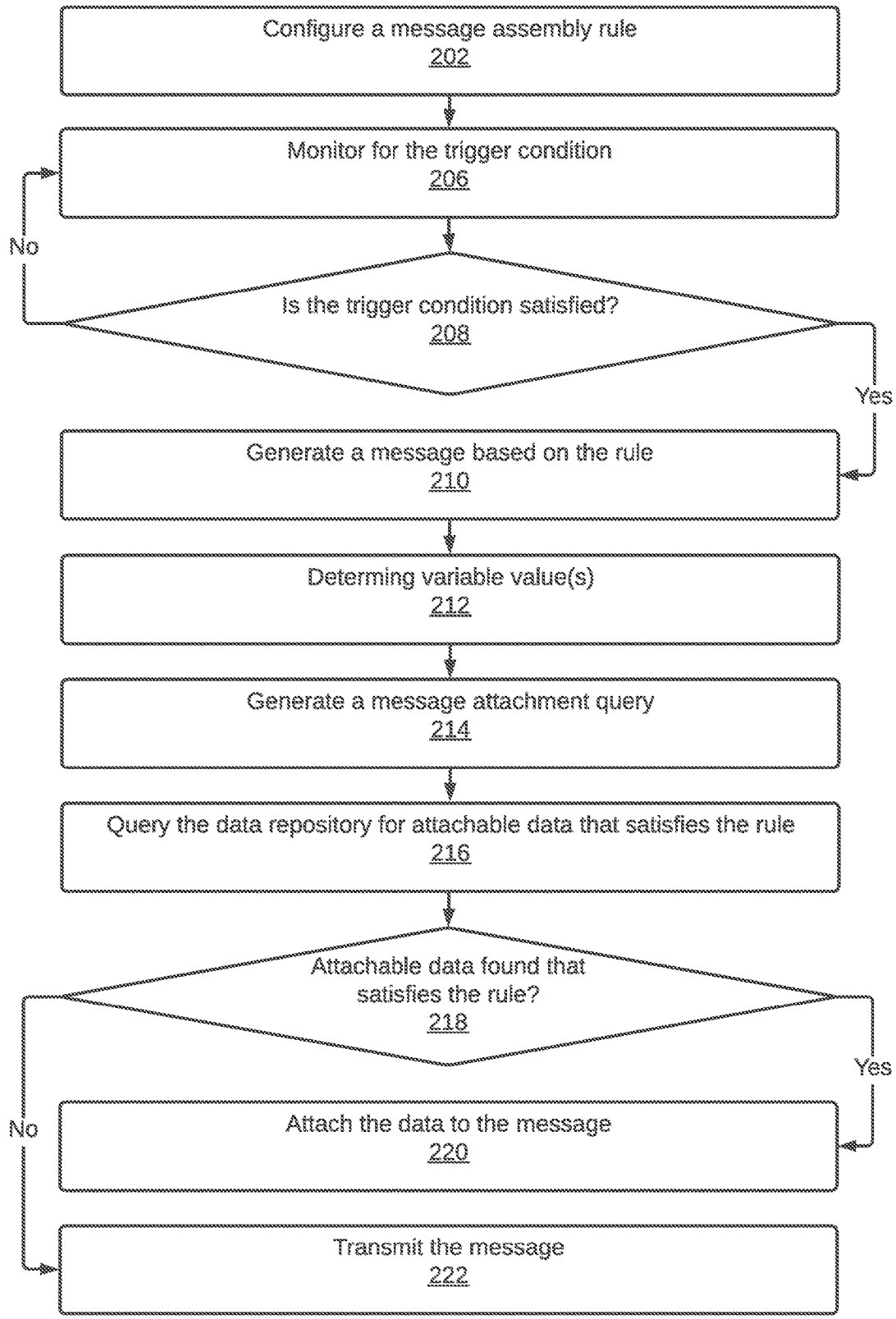
FIG. 2 illustrates an example set of operations for digital messaging with rule-driven attachments in accordance with one or more embodiments.

FIG. 2 illustrates an example set of operations for digital messaging with rule-driven attachments in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In the following discussion, references to a "system" may refer to one or more components of a system as described above. For example, one or more operations described below may be performed by a message orchestrator.

In an embodiment, the system configures a message assembly rule (Operation 202). To configure a message assembly rule, the system may receive user input, via a user interface, that specifies elements of the message assembly rule. Specifically, the user input may indicate one or more attachment criteria, one or more trigger conditions, and/or message contents (e.g., a message template, optionally with placeholders for variables) to include in the message assembly rule. Some examples of user interfaces are described in further detail below. Alternatively or additionally, the system may include one or more predefined message assembly rules. To configure a predefined message assembly rule, the system may detect a trigger condition and/or receive user input that activates the rule.

In an embodiment, when a message assembly rule is active, the system monitors for the trigger condition associated with the message assembly rule (Operation 206). To monitor for a trigger condition, the system may query one or more datasets to determine whether the data value(s) satisfy a trigger condition, monitor date/time data to determine when a scheduling condition is satisfied, and/or wait for a message orchestrator API call. The system may continue monitoring for the trigger condition (Operation 206) until the system detects that the trigger condition is satisfied (Operation 208).

Responsive to determining that the trigger condition is satisfied (Operation 208), the system may generate a message based on the message assembly rule (Operation 210). The message includes at least one recipient and optionally one or more of: text content; a sender; and/or one or more attachments. The system may identify the relevant attachment(s) based on the message assembly rule, as described below.

As noted above, a message assembly rule may include one or more attachment criteria requiring one or more values of variables. Specifically, the value of a variable may be needed to determine which attachment(s), if any, to include in a message. The system may determine the value(s) of one or more variables indicated by the message assembly rule (Operation 212). The value of a variable may depend on contextual data, such as the identity of a user who is subscribed to a particular message assembly rule and/or a value passed into the system via a message orchestrator API.

The system may generate a message attachment query to identify which message attachment(s) to include in a message (Operation 214). For example, if the attachable data is stored in a structured query language (SQL) database, the system may generate a SQL query. If one or more of the message assembly criteria require one or more values of variables, the system may include the value(s) in the query. The system may execute the query against the data repository, to identify any attachable data that satisfies the rule (Operation 216).

If the system identifies any attachable data that satisfies the rule (Operation 218), then the system may attach the data to the message (Operation 220). If the system uses an external messenger, the system may effectively attach the data to the message by including the data in an API call to the messenger.

When the message is fully assembled, including any relevant attachment(s), the system transmits the message to the intended recipient(s) (Operation 222). If the system uses an external messenger, the system may effectively transmit the message by calling the messenger API with the data needed to transmit the message.

In an embodiment, operations described herein allow for the assembly and transmission of messages that include attachments, with minimal user intervention required. Once a message assembly rule is configured and active, no user intervention at all may be required. A user may need only to subscribe to the message assembly rule, in order to receive the corresponding message(s) whenever the message transmission trigger(s) is/are satisfied. Thus, the system is able to send messages faster and more reliably than if manual intervention were required for each message. In addition, fewer system resources (e.g., memory, compute cycles, network bandwidth, etc.) are generally needed when less user intervention is needed, because the system does not need to devote the resources to serving up a user interface, responding to user input, etc.

4. EXAMPLE EMBODIMENT

A detailed example is described below for purposes of clarity. Specifically, FIGS. 3A-3I illustrate examples of graphical user interfaces (GUIs) in accordance with one or more embodiments. Components and/or operations described below should be understood as one specific example which may not be applicable to certain embodiments. Accordingly, components and/or operations described below should not be construed as limiting the scope of any of the claims.

In these examples, several customer support representatives (CSRs) each work on multiple support cases. Case records are stored in a database, and each record is associated with a text attachment that includes a log of interactions (e.g., calls, emails, changes to customer data, etc.) for that case. The CSRs would like to receive daily emails summarizing their currently open cases, including the latest interactions for each case. In these examples, the most recent interactions are stored in the first attachment returned when querying the database.

Figure 3A:
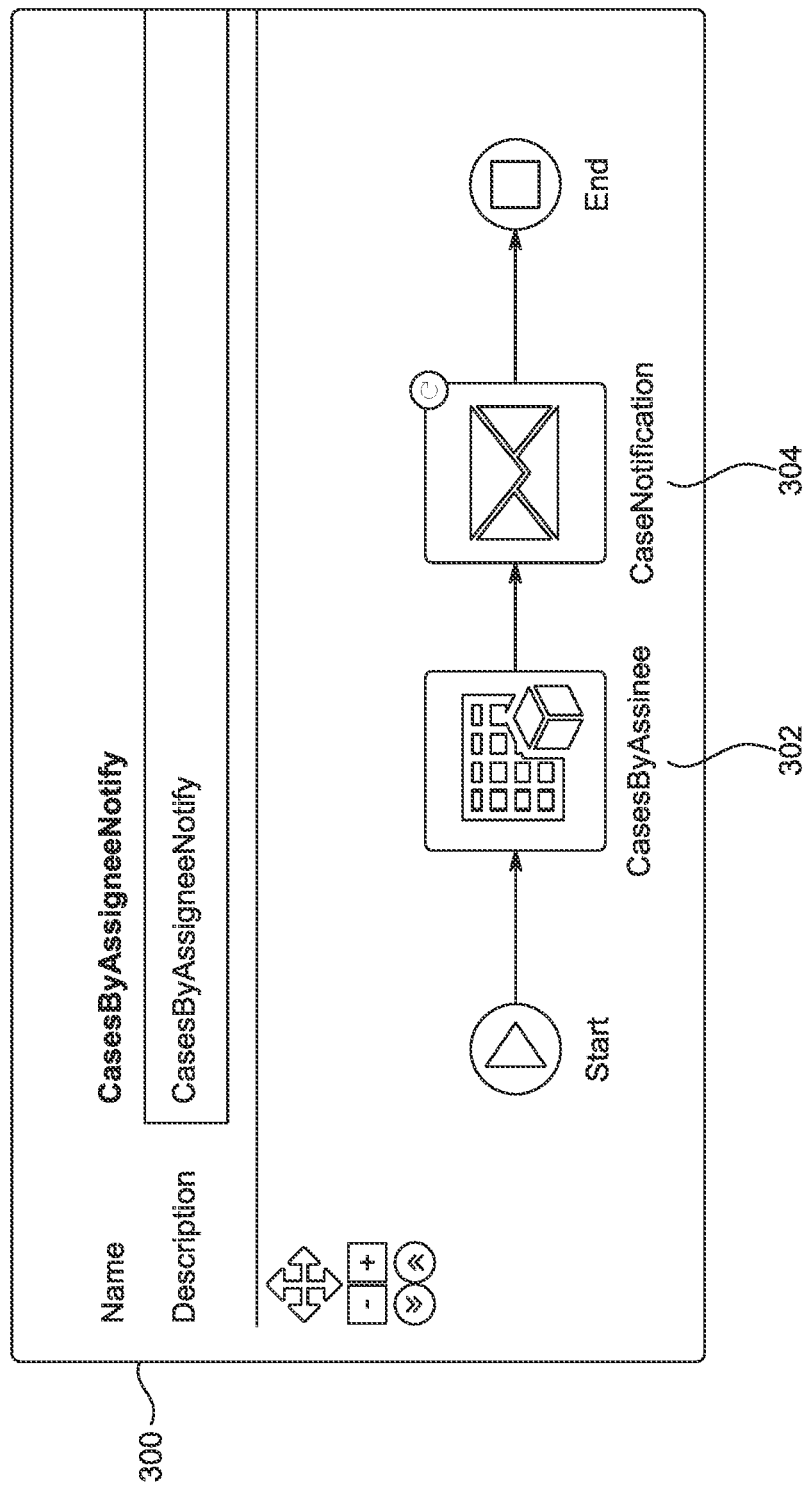

In FIG. 3A, a GUI 300 presents a high-level view of a message assembly rule (also referred to here as an "orchestration," since it is operated under control of a message orchestrator) that (1) determines which of a particular CSR's cases are open (Block 302) and (2) for each open case, transmits an email (Block 304) including an attachment with a log of the most recent interactions for that case.

Figure 3B:
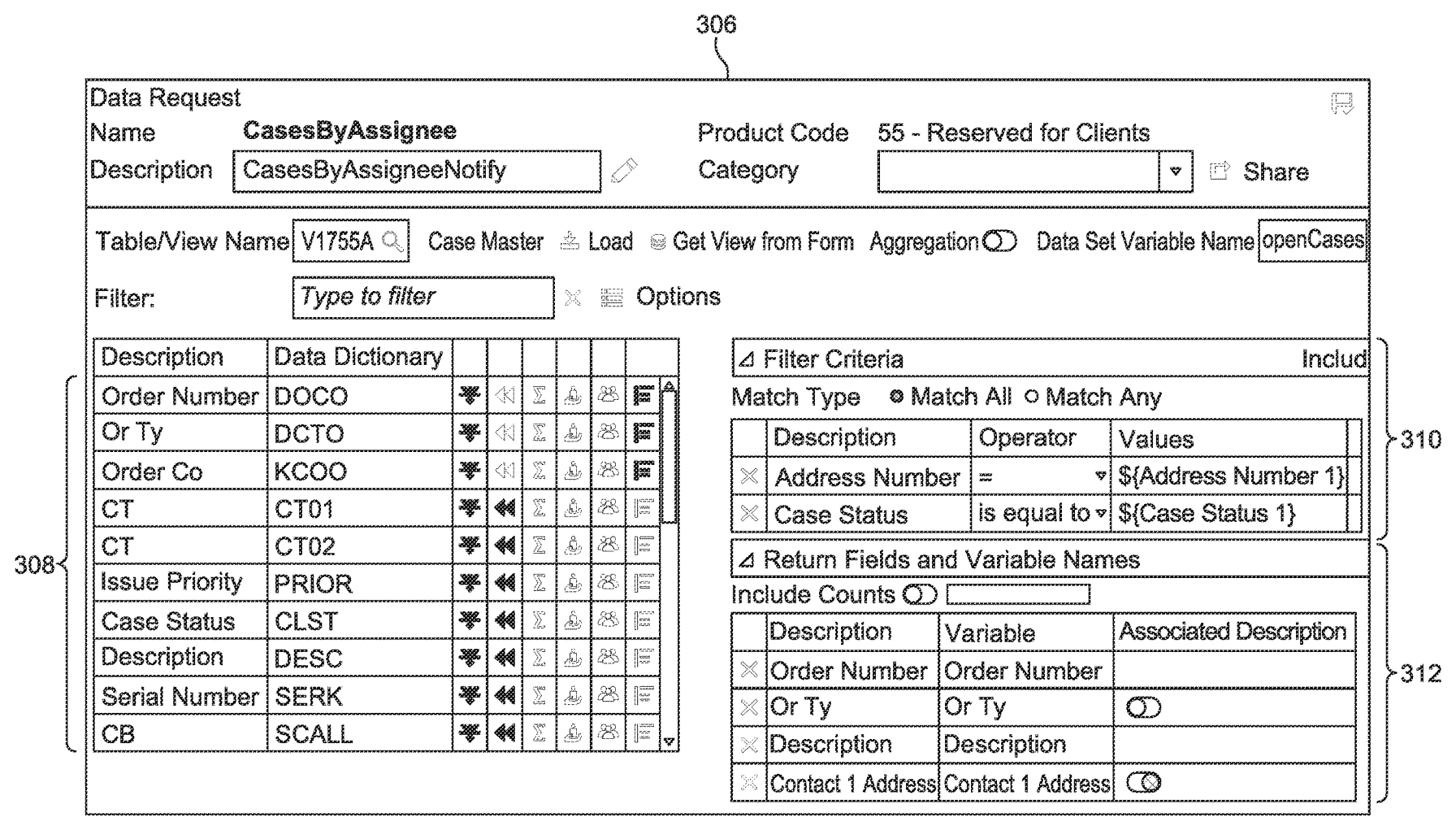

In FIG. 3B, a GUI 306 presents controls for defining a query that obtains the keys of a case record, along with details associated with the record. The GUI 306 includes a table 308 of available database fields, filter criteria 310 for filtering the case records to identify only the relevant records, and controls 312 for selecting which fields to return from the query.

In FIG. 3C, a GUI 314 includes controls for configuring a notification email. Recipient information 316 allows a user to specify who should receive the email. In this example, the recipient's address is a variable that, based on the fields returned from the query, resolves to the CSR to whom the case is assigned. Additional controls 318 allow the user to define the message contents, including message attachment criteria that identify which file(s) to attach to the notification email. In this example, an attachment criterion indicates that the first document (i.e., the log of the most recent interactions) should be attached to the email.

Figure 3D:
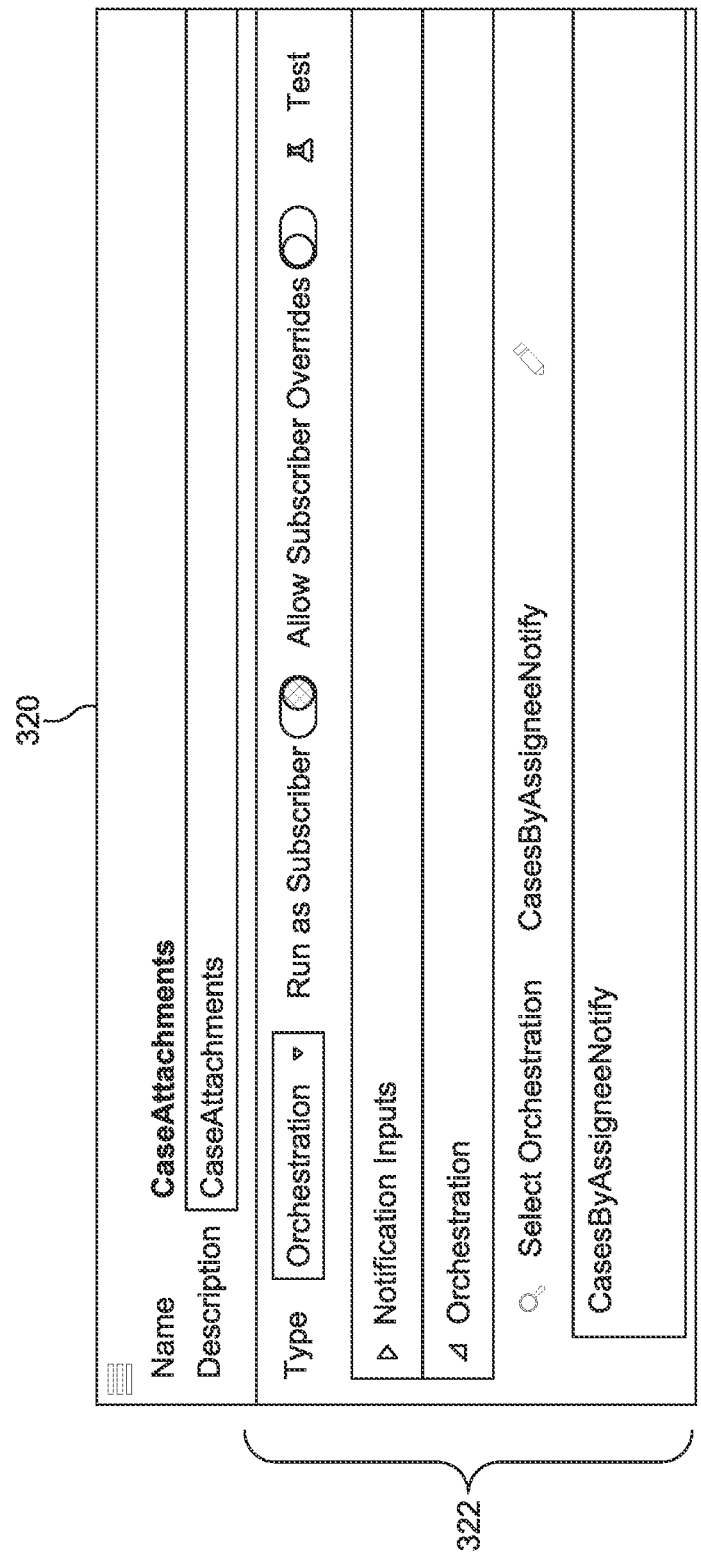

In FIG. 3D, a GUI 320 includes controls 322 that allow a user to subscribe to the notification email (i.e., to the message assembly rule that defines the notification email). Thus, the orchestration can execute with user-specific context, so that each user receives messages only for their own open cases. FIG. 3E shows two GUIs 324, 326 in which two different users (Bessie and Annette) have subscribed to the same rule.

In FIG. 3F, a GUI 328 includes controls 330 that allow a user to specify a schedule for the email notifications. In this example, the rule indicates that notifications should be sent once per day.

In FIG. 3G, a GUI 332 includes a case management table 334 showing that Bessie and Annette each have two open cases 334. Thus, as shown in FIG. 3H, when the message orchestrator applies the message assembly rule to assemble and transmit messages, Bessie receives two emails in her inbox 336 and Annette also two different emails in her inbox 340, corresponding to their respective open cases. Sample emails 338, 342 show that the email contents adhere to the specified template, including HTML attachments with the most recent interaction histories. The attachments are different for each user and for each email, because they were identified based on their association with the respective case records. Thus, Bessie and Annette each can easily review the details of their respective open cases.

Figure 3I:
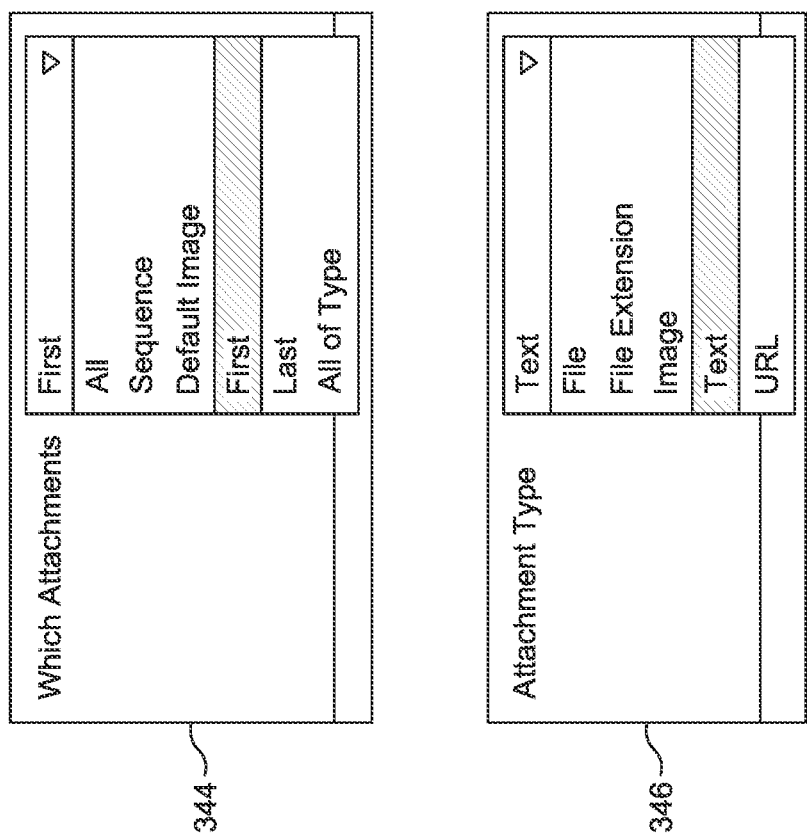

FIG. 3I shows additional examples of message attachment criteria according to one or more embodiments. In GUI 344, an attachment criterion can specify which attachment(s) to include based on their relationship to the corresponding business record: all attachments; a unique identifier or "sequence"; the default image associated with the record; the first attachment; the last attachment; and/or all attachments of a specific type. The "sequence" option refers to the unique identifier assigned to each record attachment in the data repository. To use the sequence option, the caller must know the specific sequence assigned to each desired attachment. For example, in a set of code that adds an attachment to a record, the operation that adds the attachment may return the sequence, which may then be used to retrieve the attachment for an email. GUI 346 includes an example of a file type selector; in this example, the user can select one or more of: a specific file name; files with a specific extension; image files; text files; and/or uniform resource locators (URLs).

The examples described above illustrate that one or more embodiments allow for configuring a message assembly rule—including criteria for identifying relevant attachments—with considerable complexity and flexibility, at the user's discretion. The user does not need to repeat these steps each time a notification email needs to be sent. In addition, the user does not need to reconfigure the same rule for each recipient.

5. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by, for example, executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

A client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (for example, a web browser), a program interface, or an application programming interface (API).

In one or more embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a)

the computing services requested by a particular client, (b) the aggregated computing services requested by a particular tenant, and/or (c) the aggregated computing services requested of the computer network. Such a computer network may be referred to as a "cloud network."

In one or more embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

A computer network may implement various deployment, including but not limited to a private cloud, a public cloud, and/or a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof may be accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In one or more embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In a multi-tenant computer network, tenant isolation may be implemented to ensure that the applications and/or data of different tenants are not shared with each other. Various tenant isolation approaches may be used. Each tenant may be associated with a tenant identifier (ID). Each network resource of the multi-tenant computer network may be tagged with a tenant ID. A tenant may be permitted access to a particular network resource only if the tenant and the particular network resources are associated with the same tenant ID.

For example, each application implemented by the computer network may be tagged with a tenant ID, and tenant may be permitted access to a particular application only if the tenant and the particular application are associated with a same tenant ID. Each data structure and/or dataset stored by the computer network may be tagged with a tenant ID, and tenant may be permitted access to a particular data structure and/or dataset only if the tenant and the particular data structure and/or dataset are associated with a same tenant ID. Each database implemented by the computer network may be tagged with a tenant ID, and tenant may be permitted access to data of a particular database only if the tenant and the particular database are associated with the same tenant ID. Each entry in a database implemented by a multi-tenant computer network may be tagged with a tenant ID, and a tenant may be permitted access to a particular entry only if the tenant and the particular entry are associated with the same tenant ID. However, the database may be shared by multiple tenants.

In one or more embodiments, a subscription list indicates which tenants have authorization to access which network resources. For each network resource, a list of tenant IDs of tenants authorized to access the network resource may be stored. A tenant may be permitted access to a particular network resource only if the tenant ID of the tenant is included in the subscription list corresponding to the particular network resource.

In one or more embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted only to other devices within the same tenant overlay network. Encapsulation tunnels may be used to prohibit any transmissions from a source device on a tenant overlay network to devices in other tenant overlay networks. Specifically, packets received from the source device may be encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. MICROSERVICE APPLICATIONS

In one or more embodiments, techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally include a single logical executable. With microservice applications, different microservices are independently deployable as separate executables. Microservices may communicate using Hypertext Transfer Protocol (HTTP) messages and/or according to other communication protocols via Application Programming Interface (API) endpoints. Microservices may be managed and updated separately, written in different languages, and executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

Microservices may be connected via a GUI. For example, microservices may be displayed as logical blocks within a window, frame, or other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

6.1. Triggers

The techniques described above may be encapsulated into a microservice, according to one or more embodiments. In other words, a microservice may trigger a notification (into the microservices manager for optional use by other plugged-in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects that a value has crossed a triggering threshold.

A trigger, when satisfied, may output data for consumption by the target microservice. Alternatively or additionally, when satisfied, a trigger may output a binary value indicating that the trigger has been satisfied, and/or may output the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

6.2. Actions

A plugged-in microservice application may expose actions to the microservices manager. The exposed actions may receive, as input, data or an identification of a data object or location of data that causes data to be moved into a data cloud.

The exposed actions may receive, as input, a request to increase or decrease existing alert thresholds. The input may identify existing in-application alert thresholds and whether to increase, decrease, or delete the threshold. The input may request the microservice application to create new in-application alert thresholds. The in-application alerts may trigger alerts to the user while logged into the application or may trigger alerts to the user, using default or user-selected alert mechanisms available within the microservice application itself, rather than through other applications plugged into the microservices manager.

The microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. HARDWARE OVERVIEW

In one or more embodiments, techniques described herein are implemented by one or more special-purpose computing devices. The special-purpose computing device(s) may be hard-wired to perform the techniques, and/or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. A special-purpose computing device may be desktop computer systems, portable computer systems, handheld devices, networking devices, or any other device that incorporates hard-wired and/or program logic to implement the techniques.

Figure 4:
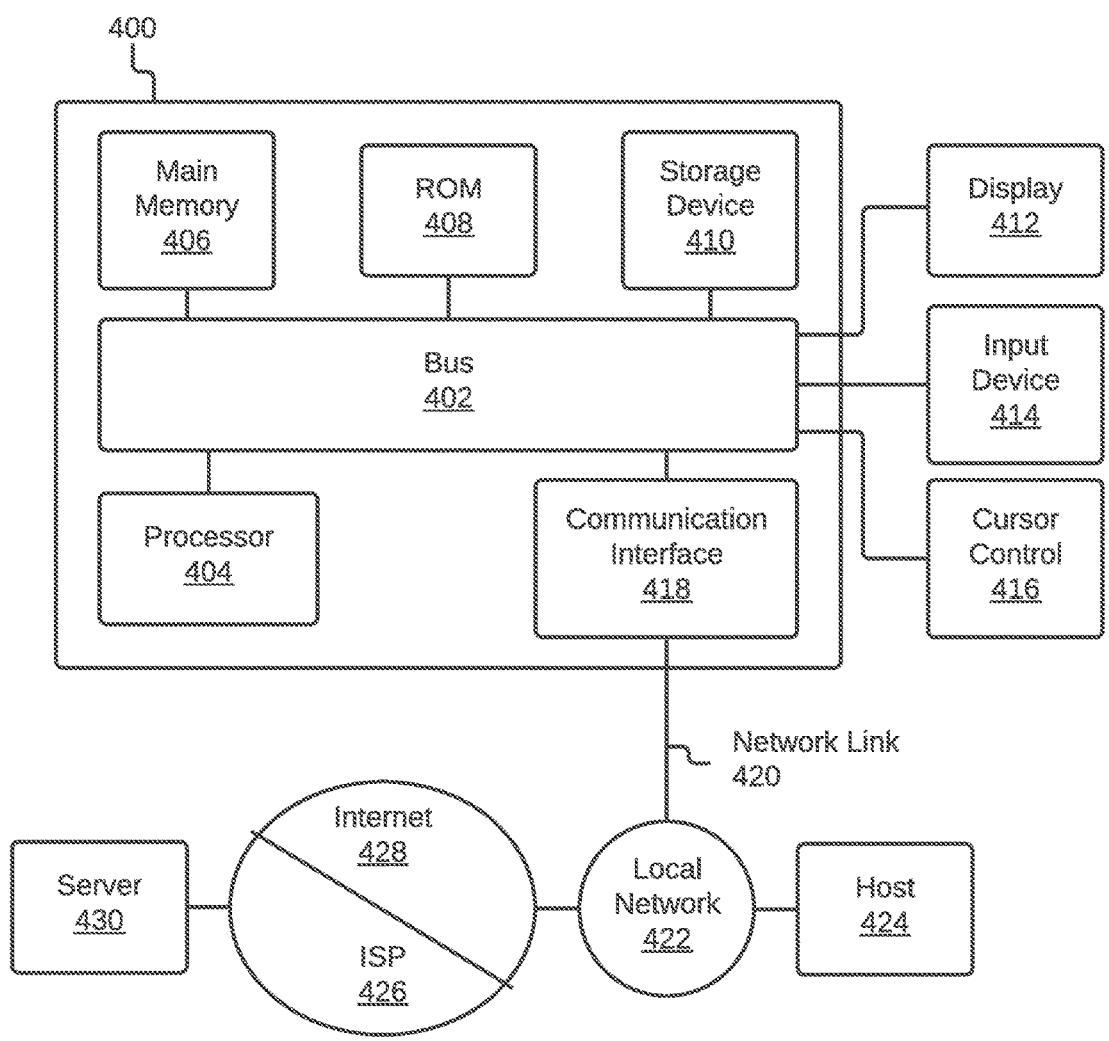
FIG. 4 shows a block diagram that illustrates a computer system in accordance with one or more embodiments.

For example, FIG. 4 is a block diagram that illustrates a computer system 400 upon which one or more embodiments of the invention may be implemented. The computer system 400 includes a bus 402 or other communication mechanism for communicating information, and a hardware processor 404 coupled with bus 402 for processing information. The hardware processor 404 may be, for example, a general-purpose microprocessor.

The computer system 400 also includes a main memory 406, such as a random access memory (RAM) or other dynamic storage device, coupled to bus 402 for storing information and instructions to be executed by processor 404. The main memory 406 also may be used for storing temporary variables or other intermediate information during execution of instructions to be executed by processor 404. Such instructions, when stored in non-transitory storage media accessible to the processor 404, render the computer system 400 into a special-purpose machine that is customized to perform the operations specified in the instructions.

The computer system 400 further includes a read only memory (ROM) 408 or other static storage device coupled to the bus 402 for storing static information and instructions for the processor 404. A storage device 410, such as a magnetic disk or optical disk, is provided and coupled to the bus 402 for storing information and instructions.

The computer system 400 may be coupled via the bus 402 to a display 412, such as a cathode ray tube (CRT), for displaying information to a computer user. An input device 414, including alphanumeric and other keys, is coupled to the bus 402 for communicating information and command selections to the processor 404. Another type of user input device is cursor control 416, such as a mouse, a trackball, or cursor direction keys for communicating direction information and command selections to the processor 404 and for controlling cursor movement on the display 412. This input device typically has two degrees of freedom in two axes, a first axis (e.g., x) and a second axis (e.g., y), that allows the device to specify positions in a plane.

The computer system 400 may implement techniques described herein using customized hard-wired logic, one or more ASICs or FPGAs, firmware, and/or program logic which in combination with the computer system 400 causes or programs the computer system 400 to be a special-purpose machine. In one or more embodiments, the techniques herein are performed by the computer system 400 in response to the processor 404 executing one or more sequences of one or more instructions contained in the main memory 406. Such instructions may be read into the main memory 406 from another storage medium, such as the storage device 410. Execution of the sequences of instructions contained in the main memory 406 causes the processor 404 to perform the process steps described herein. Alternatively, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 410. Volatile media includes dynamic memory, such as the main memory 406. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of the bus 402. Transmission media can also take the form of acoustic or light waves, such as those generated during radio frequency (RF) and infrared data communications.

Various forms of media may be involved in carrying one or more sequences of one or more instructions to the processor 404 for execution. For example, the instructions may initially be carried on a magnetic disk or solid-state drive of a remote computer. The remote computer can load the instructions into its dynamic memory and send the instructions over a telephone line or other communications medium, using a modem. A modem local to the computer system 400 can receive the data on the telephone line or other communications medium and use an infrared transmitter to convert the data to an infrared signal. An infrared detector can receive the data carried in the infrared signal and appropriate circuitry can place the data on the bus 402. The bus 402 carries the data to the main memory 406, from which the processor 404 retrieves and executes the instructions. The instructions received by the main memory 406 may optionally be stored on the storage device 410, either before or after execution by processor 404.

The computer system 400 also includes a communication interface 418 coupled to the bus 402. The communication interface 418 provides a two-way data communication coupling to a network link 420 that is connected to a local network 422. For example, the communication interface 418 may be an integrated services digital network (ISDN) card, cable modem, satellite modem, or a modem to provide a data communication connection to a corresponding type of telephone line. As another example, the communication interface 418 may be a local area network (LAN) card configured to provide a data communication connection to a compatible LAN. Wireless links may also be implemented. In any such implementation, the communication interface 418 sends and receives electrical, electromagnetic, or optical signals that carry digital data streams representing various types of information.

The network link 420 typically provides data communication through one or more networks to other data devices. For example, the network link 420 may provide a connection through a local network 422 to a host computer 424 or to data equipment operated by an Internet Service Provider (ISP) 426. The ISP 426 in turn provides data communication services through the world wide packet data communication network now commonly referred to as the "Internet" 428. The local network 422 and Internet 428 both use electrical, electromagnetic, or optical signals that carry digital data streams. The signals through the various networks and the signals on the network link 420 and through the communication interface 418, which carry the digital data to and from the computer system 400, are example forms of transmission media.

The computer system 400 can send messages and receive data, including program code, through the network(s), network link 420, and communication interface 418. In the Internet example, a server 430 might transmit a requested code for an application program through the Internet 428, ISP 426, local network 422, and communication interface 418.

The received code may be executed by processor 404 as it is received, and/or may be stored in the storage device 410 or other non-volatile storage for later execution.

8. MISCELLANEOUS; EXTENSIONS

Embodiments are directed to a system with one or more devices that include a hardware processor and that are configured to perform any of the operations described herein and/or recited in any of the claims below.

In one or more embodiments, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions that, when executed by one or more processors, cause performance of operations comprising:
   obtaining a message assembly rule comprising a set of one or more message attachment criteria;
   storing a first rule subscription that associates a first recipient with the message assembly rule;
   determining, based on the first rule subscription, a first value of a variable used by the set of one or more message attachment criteria;
   encountering a first instance of a set of one or more message transmission triggers being satisfied;
   responsive to encountering the first instance of the set of one or more message transmission triggers being satisfied:
      querying a data repository to identify a first plurality of attachable data items that satisfy the set of one or more message attachment criteria;
      generating a first message comprising a new message parameter and the first plurality of attachable data items;
      transmitting the first message to the first recipient;
   encountering a second instance of the set of one or more message transmission triggers being satisfied;
   responsive to encountering the second instance of the set of one or more message transmission triggers being satisfied:
      querying the data repository to identify a second plurality of attachable data items that satisfy the set of one or more message attachment criteria, wherein the first plurality of attachable data items and the second plurality of attachable data items differ by at least one data item;
      generating a second message comprising the second plurality of attachable data items;
   transmitting the second message to a second recipient;
   wherein querying the data repository to identify the first plurality of attachable data items that satisfy the set of one or more message attachment criteria comprises:
      generating a first query that searches for attachable data based at least on the first value of the variable;
      executing the first query to identify the first plurality of attachable data items that satisfy the set of one or more message attachment criteria;
   wherein querying the data repository to identify the second plurality of attachable data items that satisfy the set of one or more message attachment criteria comprises:
      determining a second value of the variable used by the set of one or more message attachment criteria, wherein the first value of the variable is different from the second value of the variable;
      generating a second query that searches for attachable data based at least on the second value of the variable;
      executing the second query to identify the second plurality of attachable data items that satisfy the set of one or more message attachment criteria.

2. The one or more non-transitory machine-readable media of claim 1, wherein querying the data repository to identify the first plurality of attachable data items that satisfy the set of one or more message attachment criteria comprises:
   generating a query that searches for attachable data based at least on the value of the variable;
   executing the query to identify the first plurality of attachable data items that satisfy the set of one or more message attachment criteria.

3. The one or more non-transitory machine-readable media of claim 1, the operations further comprising:
   storing, by a first microservice in a chain of microservices orchestrated by a microservices manager, at least part of the first plurality of attachable data items in the data repository,
   querying the data repository to identify the first plurality of attachable data items being performed by a second microservice in the chain of microservices orchestrated by the microservices manager.

4. The one or more non-transitory machine-readable media of claim 1, wherein the set of one or more message transmission triggers comprises at least one of (a) trigger that is associated with a preceding microservice in a chain of microservices and dependent on one or more values generated by the preceding microservice, or (b) a scheduling criterion.

5. The one or more non-transitory machine-readable media of claim 1, wherein encountering the first instance of the set of one or more message transmission triggers being satisfied comprises:
   monitoring, by a microservices manager, data exposed by a first microservice, wherein the first microservice is one of a chain of microservices logically connected by the microservice manager via respective independent interfaces;
   determining, by the microservices manager, that the data exposed by the first microservice satisfies the set of one or more message transmission triggers.

6. The one or more non-transitory machine-readable media of claim 1, wherein generating the first message comprises:
   applying the new message parameter and the first plurality of attachable data items to a message template identified by the message assembly rule.

7. The one or more non-transitory machine-readable media of claim 1, wherein determining the first value of the variable used by the set of one or more message attachment criteria comprises:
   determining, based on the first rule subscription, a user identifier associated with the first recipient;
   using the user identifier as the first value of the variable.

8. The one or more non-transitory machine-readable media of claim 1:
   wherein determining the first value of the variable used by the set of one or more message attachment criteria comprises:
      determining, based on the first rule subscription, a first user identifier associated with the first recipient;

using the first user identifier as the first value of the variable;
wherein determining the second value of the variable used by the set of one or more message attachment criteria comprises:
  determining, based on a second rule subscription that associates the second recipient with the message assembly rule, a second user identifier associated with the second recipient;
  using the second user identifier as the second value of the variable.

9. A system comprising:
at least one device comprising one or more hardware processors,
the system being configured to perform operations comprising:
obtaining a message assembly rule comprising a set of one or more message attachment criteria;
storing a first rule subscription that associates a first recipient with the message assembly rule;
determining, based on the first rule subscription, a first value of a variable used by the set of one or more message attachment criteria;
encountering a first instance of a set of one or more message transmission triggers being satisfied;
responsive to encountering the first instance of the set of one or more message transmission triggers being satisfied:
  querying a data repository to identify a first plurality of attachable data items that satisfy the set of one or more message attachment criteria;
  generating a first message comprising a new message parameter and the first plurality of attachable data items;
  transmitting the first message to the first recipient;
encountering a second instance of the set of one or more message transmission triggers being satisfied;
responsive to encountering the second instance of the set of one or more message transmission triggers being satisfied:
  querying the data repository to identify a second plurality of attachable data items that satisfy the set of one or more message attachment criteria, wherein the first plurality of attachable data items and the second plurality of attachable data items differ by at least one data item;
  generating a second message comprising the second plurality of attachable data items;
transmitting the second message to a second recipient;
wherein querying the data repository to identify the first plurality of attachable data items that satisfy the set of one or more message attachment criteria comprises:
  generating a first query that searches for attachable data based at least on the first value of the variable;
  executing the first query to identify the first plurality of attachable data items that satisfy the set of one or more message attachment criteria;
wherein querying the data repository to identify the second plurality of attachable data items that satisfy the set of one or more message attachment criteria comprises:
  determining a second value of the variable used by the set of one or more message attachment criteria, wherein the first value of the variable is different from the second value of the variable;
  generating a second query that searches for attachable data based at least on the second value of the variable;
  executing the second query to identify the second plurality of attachable data items that satisfy the set of one or more message attachment criteria.

10. The system of claim 9, the operations further comprising:
storing, by a first microservice in a chain of microservices orchestrated by a microservices manager, at least part of the first plurality of attachable data items in the data repository,
querying the data repository to identify the first plurality of attachable data items being performed by a second microservice in the chain of microservices orchestrated by the microservices manager.

11. The system of claim 9, wherein the set of one or more message transmission triggers comprises at least one of: (a) a trigger that is associated with a preceding microservice in a chain of microservices and dependent on one or more values generated by the preceding microservice, or (b) a scheduling criterion.

12. A method comprising:
obtaining a message assembly rule comprising a set of one or more message attachment criteria;
storing a first rule subscription that associates a first recipient with the message assembly rule;
determining, based on the first rule subscription, a first value of a variable used by the set of one or more message attachment criteria;
encountering a first instance of a set of one or more message transmission triggers being satisfied;
responsive to encountering the first instance of the set of one or more message transmission triggers being satisfied:
  querying a data repository to identify a first plurality of attachable data items that satisfy the set of one or more message attachment criteria;
  generating a first message comprising a new message parameter and the first plurality of attachable data items;
  transmitting the first message to the first recipient;
encountering a second instance of the set of one or more message transmission triggers being satisfied;
responsive to encountering the second instance of the set of one or more message transmission triggers being satisfied:
  querying the data repository to identify a second plurality of attachable data items that satisfy the set of one or more message attachment criteria, wherein the first plurality of attachable data items and the second plurality of attachable data items differ by at least one data item;
  generating a second message comprising the second plurality of attachable data items;
transmitting the second message to a second recipient;
wherein querying the data repository to identify the first plurality of attachable data items that satisfy the set of one or more message attachment criteria comprises:
  generating a first query that searches for attachable data based at least on the first value of the variable;
  executing the first query to identify the first plurality of attachable data items that satisfy the set of one or more message attachment criteria;

wherein querying the data repository to identify the second plurality of attachable data items that satisfy the set of one or more message attachment criteria comprises:
- determining a second value of the variable used by the set of one or more message attachment criteria, wherein the first value of the variable is different from the second value of the variable;
- generating a second query that searches for attachable data based at least on the second value of the variable;
- executing the second query to identify the second plurality of attachable data items that satisfy the set of one or more message attachment criteria, wherein the method is performed by at least device comprising one or more hardware processors.

13. The method of claim 12, the operations further comprising:
- storing, by a first microservice in a chain of microservices orchestrated by a microservices manager, at least part of the first plurality of attachable data items in the data repository,
- querying the data repository to identify the first plurality of attachable data items being performed by a second microservice in the chain of microservices orchestrated by the microservices manager.

14. The method of claim 12, wherein the set of one or more message transmission triggers comprises at least one of: (a) a trigger that is associated with a preceding microservice in a chain of microservices and dependent on one or more values generated by the preceding microservice, or (b) a scheduling criterion.

* * * * *

UNITED STATES PATENT AND TRADEMARK OFFICE
CERTIFICATE OF CORRECTION

| | | |
|---|---|---|
| PATENT NO. | : 12,069,009 B2 | Page 1 of 1 |
| APPLICATION NO. | : 17/725912 | |
| DATED | : August 20, 2024 | |
| INVENTOR(S) | : Laurent et al. | |

It is certified that error appears in the above-identified patent and that said Letters Patent is hereby corrected as shown below:

In the Drawings

On sheet 2 of 13, in FIG. 2, under reference numeral 212, Line 1, delete "Determing" and insert -- Determining --, therefor.

On sheet 3 of 13, in FIG. 3A, under reference numeral 302, Line 1, delete "CasesByAssinee" and insert -- CasesByAssignee --, therefor.

Signed and Sealed this
Seventeenth Day of December, 2024

Derrick Brent
*Acting Director of the United States Patent and Trademark Office*